United States Patent [19]

Sugier et al.

[11] 3,898,183

[45] Aug. 5, 1975

[54] CATALYTIC OXIDATION COMPOUNDS OF COMBUSTIBLE GASEOUS RESIDUES

[75] Inventors: Andre Sugier; Michel Prigent, both of Rueil-Malmaison; Georges Berrebi, Christol-Lez-Ales, all of France

[73] Assignee: Societe Pro-Catalyst, Rueil-Malmaison, France

[22] Filed: Oct. 30, 1973

[21] Appl. No.: 411,036

[30] Foreign Application Priority Data
Oct. 30, 1972   France ............................. 72.38392

[52] U.S. Cl. ................ 252/462; 252/461; 252/465; 252/466 PT; 252/466 J; 252/466 B; 252/472; 252/473; 252/474; 423/212; 423/213; 423/214
[51] Int. Cl.² ........................................... B01J 23/10
[58] Field of Search ...... 252/465, 462, 466 PT, 461, 252/466 B

[56] References Cited
UNITED STATES PATENTS

| | | | |
|---|---|---|---|
| 3,284,370 | 11/1966 | Clifford et al. .................... | 252/462 |
| 3,444,251 | 5/1969 | Gardner .......................... | 252/465 X |
| 3,554,929 | 1/1971 | Aarons ........................... | 252/465 X |
| 3,619,127 | 11/1971 | Hass et al. ....................... | 252/470 X |

FOREIGN PATENTS OR APPLICATIONS

| | | | |
|---|---|---|---|
| 954,034 | 4/1964 | United Kingdom ................ | 252/465 |

*Primary Examiner*—Helen M. S. Sneed

[57] ABSTRACT

The invention relates to catalytic oxidation compounds of combustible gaseous residues. These compounds include physical mixtures of granular catalysts of which at least one is a catalyst based on metals from the platinum group on an alumina or aluminous support of large specific surface, and at least one other is a catalyst based on metal oxides on an alumina or aluminous support of a small specific surface. These compounds have the advantage of providing better oxidation yields and are particularly appropriate for the destruction of the hydrocarbons and carbon monoxide from the exhaust of internal combustion engines.

6 Claims, No Drawings

CATALYTIC OXIDATION COMPOUNDS OF COMBUSTIBLE GASEOUS RESIDUES

The present invention relates to improved catalytic oxidation compounds of combustible gaseous residues, more specifically intended for the oxidation of certain gaseous compounds exhausted by internal combustion engines.

The problems of the elimination of toxic compounds which increase air pollution are well known, particularly those caused by the destruction of hydrocarbons and carbon monoxide exhausted by internal combustion engines are particularly difficult to solve. Various solutions have been proposed, among them the catalytic oxidation by various devices.

Although various known oxidation catalysts have been recommended for this application, no solution of real interest, both from a viewpoint of efficiency, longevity and economy, has been obtained. The reason for failure is the wide diversity of the conditions to be filled by the catalysts which must be efficient under widely different conditions of operation of the engine, which cause wide variation in the composition and temperature of the gases to be purified, and the presence of additives in many fuels which produce volatile compounds which poison the catalysts, tetraethyl lead being most widespread. Moreover, the motor vehicles subject the catalysts to vibrations which cause the destruction of these catalysts by attrition, which may be rapid and considerable. Finally, from an economic point of view, it is impractical to use large amounts of certain well known catalytically active members, such as the precious metals of the platinum group.

The solutions heretofore recommended frequently make use of metals of the platinum group, as well as various oxides, such as chromium, iron, manganese, copper, cobalt or nickel oxide. These metals and oxides were arranged on supports, frequently of alumina or on aluminous supports, particularly in the form of grains or extrusion products in the form of solids, such as of the beehive type.

From the viewpoint of resistance to vibrations, which may be expected from the use of this beehive type solids, the advantages are not evident due to the progress in the manufacture of catalyst supports in the form of different bodies, particularly spheroid granules. Moreover, these solutions are very expensive due to the difficulties of shaping, the characteristics of porosity to be obtained, and the different types to be created to cover the various applications.

Some of the previously recommended solutions attempt to make use of the advantages which may result from the use of a physical mixture of granules with different catalytic properties, or from the use of two or more layers of these granules. However, the results obtained are not of sufficient interest from the standpoint of efficiency and longevity for use in industrial or commercial practice.

It is an object of this invention to provide improved compounds formed of physical mixtures of at least two granular catalysts, of which at least one is formed of an alumina or aluminous support of a large specific surface and a catalytically active portion constituted of one or more metals of the platinum group, and at least one other catalyst formed of an alumina or aluminous support of a small specific surface and a catalytically active portion constituted by one or more metal oxides.

More specifically, on the one hand, the supports used by the catalysts based on metals of the platinum group comprise at least 80% by weight of alumina having a specific surface preferably within the range of 40 to 120 $m^2$/gram, and on the other hand, the supports used for the catalysts based on metal oxides include at least 70% by weight of alumina having an average specific surface preferably within the range of 2 to 20 $m^2$/gram.

More specifically, supports constituted from active alumina, the characteristics of which are within the ranges mentioned above and manufactured by the corporation Rhone-Progil according to French Patent No. 1,449,904, are particularly suitable because of their high resistance to attrition and crushing which for the latter may reach 15 kilograms for a ball of 2.4 to 4 mm in diameter. The catalytically active portion constituted of metals of the platinum group on a large specific surface preferably represents from 0.01% to 0.12% by weight of these catalysts and the metals used preferably are platinum, iridium, palladium and ruthenium. The catalytically active portion constituted of metal oxides of the catalysts on supports of small specific surface preferably represents from 5% to 30% by weight of these catalysts, and the oxides preferred are zinc, chromium, iron, manganese, copper, cobalt, nickel and rare earth metal oxides.

The various catalysts may be mixed in any proportions; however, in most cases the catalysts based on precious metals are used in a minority, the quantities varying preferably between 5% and 45% of the volume of the mixture.

The granular catalysts entering the catalytic compounds of the invention may be prepared in any known manner. A preferred method is the impregnation of suitable supports with aqueous solutions of salts furnishing the active elements. The supports thus treated are dried and calcined at temperatures suitable to bring these active elements into the desired condition, either metallic for those of the first granular catalyst, or oxidized for those of the second granular catalyst.

The following non-limiting examples are given by way of illustration of the different aspects of the invention.

The examples relate to various catalysts corresponding to those used to obtain the catalytic compounds of the present invention and with others which differ therefrom because the catalytically active portions are not deposited on suitable surface supports or because one and the same support receives simultaneously a metal from the platinum group and metal oxides. All of the catalysts are prepared by impregnation either of an active alumina support I of 10 $m^2$/gram specific surface in the form of balls or spheres with a diameter of 2.4 to 4 mm, or an active alumina support II of 80 $m^2$/gram specific surface, likewise in the form of spheres of 2.4 to 4 mm in diameter, obtained under the methods of the previously cited patent.

Catalytic compounds embodying the features of the present invention, compounds not in accordance with this invention, as well as certain ones of the different catalysts only, or arranged in two catalytic beds placed in series, were tested to purify by oxidation the gases emitted by a vehicle of the PEUGEOT brand, Model 204. The vehicle was equipped with a catalytic muffler of 1.5 liters capacity connected to the engine compartment, with the air injected in the exhaust chambers by an air pump operated at the end of the crankshaft, in an entrainment ratio of 1/1.

After road tests of 1000 and 15,000 kilometers respectively, the vehicle was placed on a rolling test bench and the performance of the catalyst was evaluated according to the American CVS standard, described in the Federal Register, Vol. 36, No. 128, July 1971. According to this standard and the type of vehicle in question, the CO and hydrocarbons cannot exceed 3.40 grams/mile and 0.41 grams/mile, respectively.

For reasons of convenience of the tests, each test included a cold start CVS test according to the standard applicable in 1973–1974 followed by an identical hot start CVS test, the average of both tests substantially corresponding with the result which would be obtained according to the standard applicable in 1975–1976.

CATALYST A 10 kilograms of support I are immersed in 9 liters of aqueous palladium nitrate solution containing 11 grams palladium. After 3 hours, the balls are drained, treated for 4 hours at 150°C, then 4 hours at 750°C. After cooling they are again immersed for 3 hours in the filtrate recovered from the first operation and diluted in 9 liters. After drying, the catalyst is treated for 4 hours at 150°C, then for 4 hours at 750°C.

The analysis indicates that the catalyst A, thus prepared, contains 0.08% by weight of palladium.

This catalyst is unsuitable as the catalytic compounds of the present invention.

CATALYST B 10 kilograms of support II are immersed for 3 hours in 10 liters of a palladium nitrate solution containing 8.3 grams palladium and 150 ml nitric acid density = 1.38. After drying, the catalyst is treated for 4 hours at 150°C, then for 4 hours at 750°C.

The analysis indicates that the catalyst B, thus prepared, contains 0.08% by weight of palladium.

This catalyst is suitable for the catalytic compounds of the present invention.

CATALYST C 10 kilograms of support I are impregnated in two operations with intermediate treatment of 4 hours at 150°C and 2 hours at 750°C, with 8.5 liters of an aqueous solution obtained by dissolution on the order of 1040 grams chromic anhydride, 2094 grams trihydrated copper nitrate, 1142 grams dihydrated zinc acetate, 270 grams citric acid, 340 ml ammonia, density = 0.92.

After the second impregnation the catalyst is treated for 4 hours at 150°C, then 4 hours at 750°C.

After this treatment the catalyst contains 16% by weight of chromium, copper and zinc oxide.

This catalyst is likewise suitable for use in the practice of this invention.

CATALYST D 10 kilograms of support II are impregnated by means of the solution used to prepare catalyst C, but it is diluted to 4.5 liters.

The method of preparation with intermediate drying and calcination as well as the final heat treatment, are identical with those used to prepare catalyst C.

This finished catalyst D contains 16% by weight of chromium, copper and zinc oxide; it is unsuitable to enter the compounds of the present invention.

CATALYST E 2 kilograms of catalyst A, previously prepared, are impregnated with one-fifth of the solution which had been used to prepare catalyst C1 the technique of impregnation and the treatment are identical with those applied for catalyst C.

This finished catalyst E contains 15.98% by weight of chromium, copper and zinc oxide and 0.08% by weight of palladium; this catalyst does not correspond with the invention because it contains on the same support both palladium and metal oxides.

CATALYST F 2 kilograms of catalyst B, prepared previously, are impregnated with one-fifth of the solution which had been used to prepare catalyst D. The method of impregnation and the treatment are identical with those used for catalyst D.

This catalyst F substantially has the same contents in catalytically active portions as catalyst E and for the same reason it does not respond to the invention.

CATALYST G 10 kilograms of support I are impregnated in two operations, with intermediate treatment of 4 hours at 150°C and 2 hours at 750°C, with 8.5 liters of an aqueous solution obtained by dissolution on the order of 1040 grams chromic anhydride, 2094.6 grams trihydrated copper nitrate, 1514 grams hexahydrated cobalt nitrate, 290 grams citric acid and 350 ml ammonia, density = 0.92.

After the second impregnation, the catalyst is treated for 4 hours at 150°C, then for 4 hours at 750°C.

This finished catalyst G contains 16% by weight of chromium, copper and cobalt oxide; it is suitable for use as the compounds of the invention.

CATALYST H 10 kilograms of support II are immersed for 3 hours in 10 liters of an aqueous solution of chloroplatinic acid containing 10 grams platinum; it is dried and after drying for 4 hours at 150°C, it is calcinated for 4 hours at 750°C.

The analysis indicates that the catalyst, so prepared, contains 0.1% by weight platinum; this catalyst likewise is suitable.

CATALYST I 10 kilograms of support I are impregnated with 4 liters of a solution containing 1445 grams tetrahydrated manganese nitrate, 350 grams trihydrated copper nitrate, 2100 grams hexahydrated nickel nitrate and 555 grams citric acid. After impregnation, the catalyst is dried for 4 hours at 150°C, then calcinated for 4 hours at 600°C. It then contains 10% by weight of manganese, nickel and copper oxide. This catalyst is also suitable.

CATALYST J 10 kilograms of support I are impregnated with 4.5 liters of a solution containing 1520 grams trihydrated copper nitrate, 615 grams chromic anhydride, 960 grams hexahydrated cerium nitrate and 250 grams citric acid. After impregnation, the catalyst is dried for 4 hours at 150°C, then calcined for 4 hours at 600°C. It contains 12% by weight of copper, chromium and cerium oxide. This catalyst is also suitable.

The test results obtained with these different catalysts are compiled in the following table, which also contains the O test without catalyst and without addition of air to the exhaust.

from the spirit of the invention, especially as defined in the following claims.

We claim:

1. Catalytic oxidation compounds for gaseous residues comprising physical mixtures of at least two particulate catalysts, at least one of which is formed of an alumina or aluminous support having a specific surface

TABLE

| N° Test | Catalyst | CONDITIONS | COLD START CO g/mile | COLD START HC g/mile | HOT START CO g/mile | HOT START HC g/mile | 50 % COLD START 50 % HOT START CO g/mile | 50 % COLD START 50 % HOT START HC g/mile |
|---|---|---|---|---|---|---|---|---|
| 0 | — | WITHOUT MUFFLER WITHOUT AIR | 31,0 | 4,84 | 29,15 | 3,98 | 30,07 | 4,41 |
| 1 | A | 1 000 km | 5,2 | 0,67 | 2,20 | 0,10 | 3,70 | 0,38 |
|   |   | 15 000 km | 6,5 | 0,82 | 2,85 | 0,13 | 4,67 | 0,47 |
| 2 | B | 1 000 km | 3,31 | 0,46 | 2,03 | 0,08 | 2,67 | 0,27 |
|   |   | 15 000 km | 3,68 | 0,54 | 2,49 | 0,12 | 3,18 | 0,33 |
| 3 | C | 1 000 km | 2,12 | 0,62 | 0,62 | 0,18 | 1,37 | 0,40 |
|   |   | 15 000 km | 2,32 | 0,80 | 0,74 | 0,21 | 1,53 | 0,50 |
| 4 | D | 1 000 km | 2,35 | 0,65 | 0,69 | 0,20 | 1,52 | 0,42 |
|   |   | 15 000 km | 3,02 | 0,94 | 0,90 | 0,36 | 1,96 | 0,70 |
| 5 | 20%B + 80%C Mixture | 1 000 km | 2,20 | 0,49 | 0,52 | 0,10 | 1,36 | 0,29 |
|   |   | 15 000 km | 2,38 | 0,54 | 0,56 | 0,11 | 1,47 | 0,33 |
| 6 | 20%A + 80%C mixture | 1 000 km | 4,3 | 0,66 | 1,90 | 0,16 | 3,1 | 0,41 |
|   |   | 15 000 km | 5,2 | 0,84 | 2,37 | 0,21 | 3,86 | 0,53 |
| 7 | 20%B + 80%D mixture | 1 000 km | 3,10 | 0,54 | 1,72 | 0,12 | 2,41 | 0,33 |
|   |   | 15 000 km | 3,92 | 0,67 | 2,15 | 0,16 | 3,03 | 0,42 |
| 8 | E | 1 000 km | 2,11 | 0,57 | 0,60 | 0,15 | 1,35 | 0,36 |
|   |   | 15 000 km | 2,26 | 0,72 | 0,73 | 0,17 | 1,50 | 0,45 |
| 9 | F | 1 000 km | 2,31 | 0,61 | 0,66 | 0,18 | 1,49 | 0,40 |
|   |   | 15 000 km | 2,85 | 0,86 | 0,86 | 0,32 | 1,83 | 0,59 |
| 10 | 20%B + 80%G Mixture | 1 000 km | 2,22 | 0,48 | 0,54 | 0,09 | 1,38 | 0,29 |
|   |   | 15 000 km | 2,45 | 0,55 | 0,60 | 0,14 | 1,53 | 0,35 |
| 11 | 20%B in head of reactor 80%C behind | 1 000 km | 2,30 | 0,55 | 0,94 | 0,15 | 1,62 | 0,35 |
|   |   | 15 000 km | 2,59 | 0,71 | 1,01 | 0,19 | 1,80 | 0,45 |
| 12 | H 1 000 ppm Pt on support II | 1 000 km | 3,40 | 0,47 | 2,24 | 0,11 | 2,82 | 0,29 |
|   |   | 15 000 km | 3,91 | 0,61 | 2,87 | 0,17 | 3,39 | 0,39 |
| 13 | 30%H + 70%I mixture | 1 000 km | 2,28 | 0,45 | 0,59 | 0,09 | 1,44 | 0,27 |
|   |   | 15 000 km | 2,56 | 0,52 | 0,67 | 0,11 | 1,62 | 0,32 |
| 14 | 30%H + 70%J mixture | 1 000 km | 2,50 | 0,55 | 0,66 | 0,12 | 1,58 | 0,34 |
|   |   | 15 000 km | 2,61 | 0,59 | 0,70 | 0,13 | 1,65 | 0,36 |

The tabulated results permit a certain number of statements and comparisons:

The effect of the surface on the catalysts containing metals of the platinum group is shown by comparing experiments 1 and 2. The catalysts on large surface supports are better.

The effect of the surface on the catalysts containing metal oxides is shown by comparing experiments 3 and 4. The catalysts on small surface supports are better.

The effect of the mixture of two suitable catalysts is shown by comparison of experiment 5 with experiments 1, 2, 3 and 4.

The effect of the mixture of two catalysts of which at least one is unsuitable is shown by comparing experiments 6 and 7 with experiment 5.

The other suitable mixtures (experiments 10, 13 and 14) also furnish, on the whole, better results than the catalysts of the compounds not forming part of the invention.

According to experiments 8 and 9, the presence of oxides and metals of the platinum group on the same large or small specific surface support does not produce good results.

Experiment 11 compared with experiment 5 shows that the arrangement in two successive beds of suitable catalysts will not produce as good results as their mixture.

It will be understood that changes can be made in the details of formulation and operation, without departing of at least 40 m²/gram and of a catalytically active portion formed of one or more of the metals of the platinum group and at least another of which is formed of an alumina or aluminous support having a specific surface no greater than 20 m²/gram and a catalytically active portion of one or more oxides of a metal selected from the group consisting of zinc, chromium, iron, manganese, copper, cobalt, nickel and rare earth metals.

2. Catalytic compounds as claimed in claim 1 in which the metals of the platinum group are selected from the group consisting of platinum, iridium, palladium and ruthenium.

3. Catalytic compounds as claimed in claim 2 in which metal is present in an amount within the range of 0.01% to 0.12% by weight.

4. Catalytic compounds as claimed in claim 1 in which the metal oxides are present in an amount within the range of 5% to 30% by weight.

5. Catalytic compounds as claimed in claim 1 in which the catalyst based on a metal of the platinum group is on a support having a specific surface within the range of 40–120 m²/gram and in which the support for the metal oxide has a specific surface within the range of 2–20 m²/gram.

6. Catalytic compounds as claimed in claim 1 in which at least one of the granular catalysts is manufactured by impregnation of the supports.

* * * * *